United States Patent
McCarthy et al.

(10) Patent No.: US 12,261,860 B2
(45) Date of Patent: Mar. 25, 2025

(54) CYBERSECURITY STATE CHANGE BUFFER SERVICE

(71) Applicant: Revelstoke Security, Inc., Campbell, CA (US)

(72) Inventors: Joshua McCarthy, Morgan Hill, CA (US); Nicholas Graves, Fresno, CA (US); David B McKinley, Dartmouth, MA (US); William Wilson, Fremont, CA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 350 days.

(21) Appl. No.: 18/093,862

(22) Filed: Jan. 6, 2023

(65) Prior Publication Data
US 2023/0156020 A1 May 18, 2023

Related U.S. Application Data

(63) Continuation-in-part of application No. 17/825,024, filed on May 26, 2022.
(Continued)

(51) Int. Cl.
H04L 9/40 (2022.01)
(52) U.S. Cl.
CPC ...... *H04L 63/1416* (2013.01); *H04L 63/1433* (2013.01); *H04L 63/20* (2013.01)
(58) Field of Classification Search
CPC . H04L 63/1416; H04L 63/1433; H04L 63/20; H04L 63/1425
See application file for complete search history.

(56) References Cited

U.S. PATENT DOCUMENTS 8,392,218 B2 3/2013 Becker et al.
10,534,971 B2 1/2020 Huber, Jr. et al.
(Continued)

FOREIGN PATENT DOCUMENTS

KR 10-2020-0083874 A 7/2020

OTHER PUBLICATIONS

Axel Buecker et al. "IBM Security Solutions Architecture for Network, Server and Endpoint" Published Feb. 2011 (pp. 1-484) https://www.redbooks.ibm.com/redbooks/pdfs/sg247581.pdf (Year: 2011).*
(Continued)

*Primary Examiner* — Joseph P Hirl
*Assistant Examiner* — Thomas A Gyorfi
(74) *Attorney, Agent, or Firm* — Barnes & Thornburg LLP

(57) ABSTRACT

Disclosed techniques include integrated cybersecurity state change buffer service. A plurality of network-connected cybersecurity threat protection applications is accessed. A background synchronization service is initiated. The background synchronization service receives status from at least one of the plurality of cybersecurity threat protection applications. The status comprises high-volume incoming status data. The status is monitored, using the background synchronization service. A real-time state change in the status is identified, based on the monitoring. The identifying a real-time state change includes quantifying incoming data associated with the status. An actionable response is triggered, based on the state change that was identified. The actionable response enables self-healing of a connected security orchestration, automation, and response (SOAR) application system. The status is processed, using the background synchronization service, to provide the actionable response. The
(Continued)

processing the status includes determining a classification of the state change.

23 Claims, 7 Drawing Sheets

Related U.S. Application Data

(60) Provisional application No. 63/404,983, filed on Sep. 9, 2022, provisional application No. 63/350,891, filed on Jun. 10, 2022, provisional application No. 63/327,853, filed on Apr. 6, 2022, provisional application No. 63/297,273, filed on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | | |
|---|---|---|---|
| 10,621,172 B2 | 4/2020 | Azaria et al. | |
| 10,776,316 B2 | 9/2020 | Baggeroer et al. | |
| 10,838,709 B2 | 11/2020 | Eapen et al. | |
| 10,901,863 B2 | 1/2021 | Lukkoor et al. | |
| 10,922,452 B2 | 2/2021 | Liu et al. | |
| 10,924,527 B2 | 2/2021 | Miller | |
| 10,936,234 B2 | 3/2021 | Su | |
| 10,938,706 B1 | 3/2021 | Zacks et al. | |
| 10,938,951 B2 | 3/2021 | White et al. | |
| 10,956,880 B2 | 3/2021 | Towle | |
| 11,611,590 B1* | 3/2023 | Amar | G06Q 10/105 |
| 2013/0318542 A1 | 11/2013 | Zamora | |
| 2015/0026810 A1 | 1/2015 | Friedrichs et al. | |
| 2016/0330219 A1* | 11/2016 | Hasan | H04L 63/1408 |
| 2018/0027006 A1* | 1/2018 | Zimmermann | H04L 63/0227 |
| | | | 726/11 |
| 2018/0121316 A1 | 5/2018 | Ismael et al. | |
| 2019/0297118 A1* | 9/2019 | Haugsnes | H04L 63/1441 |
| 2020/0244412 A1 | 7/2020 | Kalhan | |
| 2020/0280443 A1 | 9/2020 | Simons | |
| 2020/0305011 A1 | 9/2020 | Yaniv et al. | |
| 2020/0342552 A1 | 10/2020 | Sulit et al. | |
| 2020/0363781 A1 | 11/2020 | Mangels et al. | |
| 2020/0380006 A1 | 12/2020 | Rockwell et al. | |
| 2021/0014153 A1 | 1/2021 | Amend et al. | |
| 2021/0042589 A1 | 2/2021 | Tokarev Sela et al. | |
| 2021/0070333 A1 | 3/2021 | Chen | |
| 2021/0099420 A1 | 4/2021 | Zhang | |

OTHER PUBLICATIONS

Sangani, Nilaykumar Kiran, and Haroot Zarger. "Machine learning in application security." Advances in Security in Computing and Communications. IntechOpen, 2017.

Boutaba, Raouf, et al. "A comprehensive survey on maching learning for networking: evolution, applications and research opportunities." Journal of Internet Services and Applications 9.1 (2018): 1-99.

International Search Report dated Aug. 31, 2022 for PCT 2022/031003.

* cited by examiner

CYBERSECURITY STATE CHANGE BUFFER SERVICE

RELATED APPLICATIONS

This application claims the benefit of U.S. provisional patent applications "Cybersecurity State Change Buffer Service" Ser. No. 63/297,273, filed Jan. 7, 2022, "Cybersecurity Workflow Management Using Autodetection" Ser. No. 63/327,853, filed Apr. 6, 2022, "Cybersecurity Operations Center Load Balancing" Ser. No. 63/350,891, filed Jun. 10, 2022, and "Cybersecurity Operations Case Triage Groupings" Ser. No. 63/404,983, filed Sep. 9, 2022.

This application is also a continuation-in-part of U.S. patent application "Cybersecurity Threat Management Using Element Mapping" Ser. No. 17/825,024, filed May 26, 2022, which claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to cybersecurity state change buffer service.

BACKGROUND

Since the late 1940s, many countries have become increasingly dependent on digital computer systems. World War II became a catalyst for many of the advances in computer science, driven by the need for secure communications and the desire to decode messages used by the opposing forces and their allies. After the war, governments and other organizations began to use computers to solve other complex problems and to look for patterns in large quantities of data, such as the work on decoding DNA molecules in the 1950s. As advantages of digital computers became more apparent, governments and large corporations began to use them for defense projects, network communications, and mass record storage. Using computer systems to monitor and control other systems and processes in industries such as manufacturing, energy production, and transportation further expanded their usefulness. As a result, the value of the computer systems and the data amassed and analyzed by the systems grew, as did the users' reliance on the computer systems.

During the 1950s and 1960s, the cost of computer systems and their related storage devices was quite high. The systems were physically large and, in many cases, required specialized facilities to house them. Early generations of computers had to be accessed directly and physical access was limited to authorized users only. The "systems operators" were collocated with input and output devices such as card readers and punches, perforated paper tape units, and keyboard-printing units that were wired directly into the main computing machines. The users had to travel to computer installations or "machine rooms", which were cold, drafty, noisy, and potentially lethal due to fire suppression technologies. As the use of computer systems expanded, "remote" terminals were provided. Users could access computers from terminals distributed around an office building, school, or hospital, among other enterprises. Computers also could access each other through hardwired and telephonic connections. Even with the increased ease of access, the security of such computer systems was relatively easy to control. A malefactor needed physical access to the computer systems, or a remote terminal connected to the system, in order to load malicious code, to remove data, or to otherwise compromise it.

Then, in the late 1970s, personal computers entered the marketplace with products from various technology companies, some well-established and others just starting up. Just as governments and corporations did, private individuals rapidly increased their use of these systems. Eventually, cell phones, laptops, and tablets increased the rate at which users added valuable confidential information and activities to computer systems and networks. Today, digital computers and technology have been incorporated into every facet of our daily lives from food production, storage, transportation, preparation, and consumption to wrist monitors that record our sleep patterns and recommend and track exercise programs to improve our well-being. Transportation, health care, defense, finance, energy, communications, manufacturing, recreation, and many other fields are now saturated with digital computer systems and networks. The data collected by these computer systems is also routinely analyzed and compared so that the patterns formed by our personal and work lives, both individually and corporately, can be more fully understood and available to be acted upon.

As the value of the data stored on computer systems grew, the motivation of bad actors to compromise these systems grew as well. Modern networking technologies enable computer access from practically any location on earth. Such access enables authorized users to log into a computer network from the office, coffee shop, airplane, or vacation spot. This convenience of access means that criminals as well can attempt access from around the globe without regard to ownership, jurisdiction, or borders.

SUMMARY

Continuous and reliable computing operations of organizations are directly dependent on effective and thorough management of cybersecurity threats. The organizations include businesses, financial institutions, hospitals, government agencies, retailers, universities, schools, and so on. The organizations are acutely aware of myriad cybersecurity threats. They actively configure and implement state-of-the art cybersecurity hardware and software to secure their information technology (IT) infrastructure against the threats. While preventative measures such as application and operating system updates, former user deactivation, and other housekeeping activities are critical to successful IT operations, these measures alone fall far short of providing comprehensive protection. The cybersecurity threats are constantly evolving and continue to become significantly more sophisticated. Thus, constant system-wide vigilance and anticipatory action are required. Seemingly as soon as a solution is found that identifies, reacts to, and eradicates a threat such as a virus; thwarts a Trojan horse program; or detects and deletes a phishing attack; the malefactors behind the cybersecurity attacks adapt their techniques by using new attack vectors, advanced social engineering ploys, and many other deceptive and malicious techniques.

Disclosed techniques enable cybersecurity management based on a cybersecurity state change buffer service. A plurality of network-connected cybersecurity threat protection applications is accessed. The cybersecurity threat protection applications can include one or more data management schemas. The plurality of threat protection applications can include cybersecurity threat protection application capabilities. The cybersecurity threat protection application capabilities can include endpoint protection, anti-phishing protection, antivirus protection, firewall protection, man-in-the-middle protection, denial of service protection, distributed denial of service protection, and ransomware protection. A background synchronization service is initiated, wherein the background synchronization service receives a status from at least one of the plurality of cybersecurity threat protection applications. The status comprises high-volume incoming status data. The status data can originate from one or more of the cybersecurity threat protection applications. The status is monitored using the background synchronization service. The monitoring can include using the background synchronization service to monitor cybersecurity threat protection application health. Application health can include normal operation, abnormal operation, suspicious operation, etc. A real-time state change in the status is identified based on the monitoring. The identifying a real-time state change includes quantifying incoming data associated with the status. The quantified incoming data associated with the status can be compared to a typical quantity of incoming data. An atypical quantity of incoming data can indicate detection of a cybersecurity threat, rogue operation, etc. An actionable response is triggered based on the state change that was identified. The actionable response can be informed by processing the status. Processing the status can enable filtering incoming status data, determining a classification of the state change, etc.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
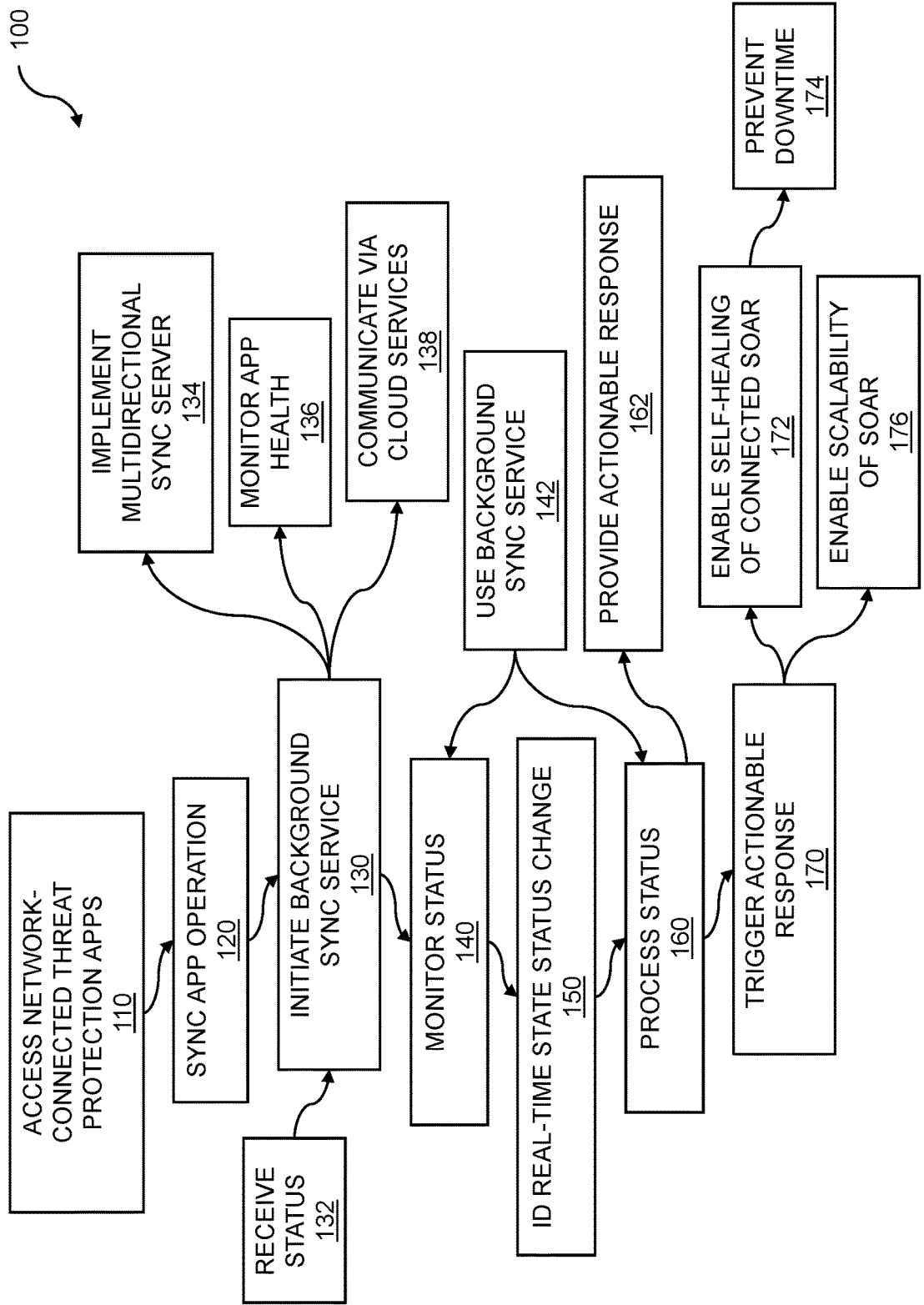
FIG. 1 is a flow diagram for cybersecurity state change buffer service.

Bad actors, whether foreign or domestic, constantly mount sophisticated attacks on the information technology infrastructures of enterprises of all sizes. These malefactors include criminals and organized crime; government sponsored, endorsed, and protected actors; and terrorists and extortionists; among many others with malicious intent. Businesses, retailers, universities, government agencies, hospitals, research laboratories, and other enterprises and organizations are perpetually under attack. Cybersecurity threats such as cyberattacks have been detected to occur as often as every few seconds. Enterprises from sectors such as retail, high technology, and government are by far the most frequently targeted. The "big three" sectors are attacked because of the value of their data and their ability to render large financial payouts. Other targets of high value include media companies who are claimed by cyber-attackers to have insulted or humiliated national leaders, and national infrastructures such as fuel pipelines and energy grids. Small businesses and individuals are not immune from cybercriminal attacks and are further targeted. The smaller enterprises and the individuals are targets for quick payouts, even if relatively small, and for identity theft. Fuel and energy infrastructures are attacked because of the potential to cause both huge energy delivery disruptions and financial market chaos. Small enterprises may be willing to pay any amount they can to recover their business data from cybercriminals who have maliciously encrypted the enterprises' data. An individual may freely and unwittingly provide usernames and passwords associated with bank or brokerage accounts; personal information such as telephone numbers, email addresses, physical addresses, age, gender, birthdate, national identification number, and so on; to the cybercriminals, not knowing they are doing so. Illegally obtained personal information can be used to open bank accounts, obtain credit cards or loans, and perform other actions which can be ruinous to the individual's financial wellbeing, credit score, and more. The individual may also drain their personal savings or run up substantial personal debt to transfer funds to what turns out to be an offshore financial institution, thinking they are aiding a friend or loved one in distress.

Enterprises of all sizes expend substantial financial and human resources on cybersecurity activities. The cybersecurity activities, which include cybersecurity threat management, are designed to protect computing systems, data, and other critical information technology (IT) infrastructure by detecting and countering cybersecurity threats. Each of the cybersecurity activities is essential to success in securing IT infrastructure, and to ensuring safe and reliable computing operations of the enterprises. Further critical threat protections that are specific to the particular enterprise or the type of enterprise can be put in place. These latter threat protections can include advanced techniques such as biometric verification, two-factor authentication, coded challenges and responses, encrypted or secured communications channels such as virtual private networks, and so on. The enterprises can include public and private organizations that can be large, medium, and small in terms of numbers of employees, annual sales, and the like. The enterprises can include businesses, hospitals, government agencies, research facilities, universities, among many others. The enterprises are acutely aware that cybersecurity best practices are not merely desirable but instead are essential to the continued operation of, and likely the survival of, the enterprises.

Cybersecurity, when done right, not only integrates highly complex suites of tools and activities, but is also extremely expensive. Further, the tasks associated with cybersecurity are ever changing ones. The cybersecurity measures taken by the enterprises today may thwart known or recently discovered attack techniques, but the techniques used by cybercriminals are constantly evolving, specifically in attempts to thwart the cybersecurity measures. Nearly as soon as a detection tool is developed for identifying, reacting to, and eradicating a cybersecurity threat such as a virus, a Trojan horse program, a phishing attack, or a denial-of-service attack, the cybercriminals adapt their cyberthreat techniques. This results in an ever-escalating, high stakes cyber-game of cat and mouse. The cyberthreat adaptation includes targeting popular electronic devices, using new attack vectors, improving social engineering stratagems, and employing other intentional deceptions. Purported links to scandalous and compromising photographs of famous people, earnest promises of shared wealth from displaced continental nobility, and desperate pleas for help from relatives and friends who are in serious legal or financial trouble while visiting distant locations are specifically designed by their perpetrators to induce a visceral reaction and to motivate their victims to react quickly and unthinkingly. Other ploys include completely copying the landing page of a website with which the victim is familiar. Unless the victim looks at the web address, she or he would be unaware of the deception until their personal information is stolen, or their bank accounts are emptied, and the funds are transferred to an offshore bank. Further subterfuges include "man-in-the-middle" attacks, where the communications between an unwitting victim and a legitimate website are monitored to harvest personal information, usernames and passwords, etc.

In disclosed techniques, cybersecurity threat management is accomplished using a cybersecurity state change buffer service. Network-connected cybersecurity threat protection applications can generate data associated with normal IT infrastructure operation, anomalous operation, detected cyberattacks, and so on. Identification of real-time state changes in status, and processing of the status data, are critical to quickly determining the extent of a threat, a risk level associated with the threat, a number of devices compromised or attacked by the threat, and so on. A background synchronization service can be initiated that receives status from at least one of the plurality of cybersecurity threat protection applications. The status can be monitored using the background synchronization service. The monitoring can determine normal operation, anomalous operation, suspicious operation, and the like. The status can further be processed, where the processing can enable filtering of incoming status data determining a classification of a state change, etc. The processing the status can inform an actionable response. Changes in status can indicate a possible cybersecurity threat, a hacked or damaged cybersecurity threat protection application, and other potential problems. A real-time state change in the status can be identified based on the monitoring. A state change that was identified can trigger an actionable response. The actionable response can enable self-healing of a cybersecurity threat protection application such as a connected security orchestration, automation, and response (SOAR) system. The self-healing can be used to prevent SOAR downtime. The actionable response can also enable scalability of a connected security orchestration, automation, and response (SOAR) system.

FIG. 1 is a flow diagram for cybersecurity state change buffer service. Cybersecurity management can be accomplished based on cybersecurity state change buffer service techniques. Status generated by a variety of network-connected cybersecurity threat protection applications can be monitored using a background synchronization service. The monitoring can track the status for changes. The changes can be represented by increases in an amount of status data, decreases in status data, suspicious status data, and so on. The changes can include or represent an anomalous information technology (IT) infrastructure operation, detected threats and attacks, and so on. Real-time state changes in status are identified based on the monitoring. The changes can include gradual changes, abrupt changes, discontinuance of status data, etc. An actionable response is triggered based on the state change that was identified. The actionable response can be provided to a cybersecurity management system such as a security orchestration, automation, and response (SOAR) system. The actionable response can enable self-healing of a connected security orchestration, automation, and response (SOAR) system. The self-healing of the SOAR system can prevent SOAR downtime. The actionable response can enable scalability of a SOAR system. The scalability of the SOAR can enable scaling of SOAR capabilities to match a given cybersecurity threat load. Further, the actionable response comprises a recommendation for a cybersecurity professional. The recommendation can include a policy, recommended cybersecurity tools, sources of cybersecurity threat information, etc. The flow 100 shows a computer-implemented method for cybersecurity management.

The flow 100 includes accessing a plurality of network-connected cybersecurity threat protection applications 110. The threat protection applications can defend computer systems, data systems, data networks, endpoint devices, and so on against various types of malicious cyberattacks. The plurality of cybersecurity threat protection applications can include security information and event management (SIEM) applications. More advanced techniques can also be applied. In embodiments, the plurality of cybersecurity threat protection applications can include security orchestration, automation, and response (SOAR) applications. The malicious cyberattacks can include malware attacks, hacking attacks, distributed denial of service attacks (DDoS), man-in-the-middle attacks, and so on. The applications can include antivirus, anti-phishing, and anti-cryptojacking applications, tools for threat hunting and threat intelligence, identity verification, endpoint protection, forensic investigation, incident management, and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on. The accessing a plurality of cybersecurity threat protection applications can be enabled by digitally providing credentials to the plurality of cybersecurity threat protection applications. The credentials can include a username and password, a two-factor authentication process, a one-time digital access code, etc.

The flow 100 further includes synchronizing operation 120 of two or more of the plurality of cybersecurity threat protection applications. The synchronizing can be used to compare the status of the two or more applications. The synchronizing can perform a "reality check" on the status generated by an application. The synchronizing can be used to accomplish a majority vote on a status when three or more applications are synchronized. In embodiments, the synchronizing is based on a state change that was identified (discussed below). In a usage example, a cybersecurity threat protection application can generate a status that can indicate that a cybersecurity threat was detected. A second cybersecurity threat protection application can be synchronized with the first application. The synchronization can include noting whether the second application also indicates that a cybersecurity threat was detected, the time at which the threat occurred, and so on. The status of the two applications can be compared for whether both applications detected a cybersecurity threat at substantially the same time. If so, the threat can be further examined, and a response can be launched. If the applications disagree, further analysis can indicate that there may be a problem with one of the applications and that action to repair the application should be taken.

The flow 100 includes initiating 130 a background synchronization service. The background synchronization service can synchronize a status obtained from one or more of the plurality of network-connected cybersecurity threat protection applications. The synchronization can include comparing a status, such as whether a threat was detected by the applications. The synchronization can include checking a timestamp or other time indication to determine whether applications detected the cybersecurity threat at substantially the same time. In embodiments, the background synchronization service comprises a security orchestration, automation, and response (SOAR) microservice. The background synchronization service can communicate with the plurality of network-connected cybersecurity threat protection applications. In embodiments, the background synchronization service can communicate to the plurality of network-connected cybersecurity threat protection applications using cloud services. The cloud services can provide cybersecurity threat detection services, can configure the threat detection services, and so on. In embodiments, the cloud services and the background synchronization service can enable redeployment of cybersecurity threat protection assets. The redeployment of cybersecurity threat protection assets can be performed to battle cybersecurity threats within an IT infrastructure. The redeployment can accomplish scaling of the SOAR microsystem.

In the flow 100, the background synchronization service receives status 132 from at least one of the plurality of cybersecurity threat protection applications. The status can be received by the background synchronization service by more than one threat protection application. In embodiments, the background synchronization service can include a SOAR microservice. In the flow 100, the microservice can implement 134 a multidirectional synchronization server. The multidirectional synchronization server can push data such as status data, pull status data, exchange status data, etc. In the flow 100, the background synchronization service can monitor cybersecurity threat protection application health 136. The monitoring health can include receiving a response from an application, determining that the response is within application parameters, and the like. In the flow 100, the background synchronization service can communicate 138 to the plurality of network-connected cybersecurity threat protection applications using cloud services. The communicating can be based on exchanging data packets, messages, control instructions, and so on. The cloud services can include software as a service (SaaS), platform as a service (PaaS), infrastructure as a service (IaaS), and so on. The cloud services can include public cloud services, private cloud services, etc.

The flow 100 includes monitoring 140 the status. Discussed previously, the plurality of network-connected cybersecurity threat protection applications can send a status to the background synchronization service. In the flow 100, the monitoring is accomplished using the background synchronization service 142. The status can include a signal, a flag, a message, a packet, and so on. The monitoring can be used to track that a message can be received from an application, that the appropriate message is received, and so on. In embodiments, the status can include high-volume incoming status data. The flow 100 includes identifying 150 a real-time state change in the status, based on the monitoring. The status from a given cybersecurity threat protection application can vary over time. The variation can be attributable to actions taken by the detection application, to a time such as an hourly report, and so on. A state change can indicate that an event has occurred, where an event can include a threat detection, an application error, etc. Detecting a state change in the status in real-time can enable cybersecurity management to respond rapidly to a detected possible or real threat. In embodiments, the identifying a real-time state change can include quantifying incoming data associated with the status. The quantifying can include counting the data, calculating the quantity of data per unit time, etc.

The flow 100 further includes processing 160 the status. The processing is accomplished using the background synchronization service 142. The processing of the status can be based on executing processes, heuristics, and so on. The processing the status can be accomplished by applying artificial intelligence (AI) techniques such as machine learning (ML) techniques. In embodiments, the processing the status can enable filtering incoming status data. The filtering can include detecting a "filtering out" or removing redundant, erroneous, or spurious status data. In embodiments, the processing the status can include determining a classification of the state change. The classification can include a label associated with a threat such as possible, suspected, or likely threat. The label can include a designation such as known threat or unknown threat. The classification can include a type of threat such as a virus threat, a phishing threat, a denial of service (DoS) or distributed denial of service (DDoS) threat, etc. In the flow 100, the processing is performed to provide an actionable response 162. The actionable response can include a policy, a process, a recommendation, a tool, and so on.

The flow 100 includes triggering an actionable response 170, based on the state change that was identified. In embodiments, the processing the status can inform the actionable response. In the flow 100, the actionable response can enable self-healing 172 of a connected security orchestration, automation, and response (SOAR) system. The self-healing can include "on the fly" adjustments, repairs, reconfigurations, etc., to the SOAR system. In the flow 100, the self-healing can prevent SOAR downtime 174. Preventing SOAR downtime can maintain continuous SOAR monitoring and protection of IT infrastructure elements. In the flow 100, the actionable response can enable scalability 176 of a connected security orchestration, automation, and response (SOAR) system. A SOAR system can be scaled to optimize cybersecurity threat detection, to minimize response time, to optimize computational resource usage, and so on.

The actionable response can include further goals, objectives, tasks, and so on. In embodiments, the actionable response can include a recommendation for a cybersecurity professional. The recommendation can include a threat response policy or procedure, one or more tools to use to eradicate a threat, sources of information to determine the extent of a threat, and so on. In embodiments, the recommendation can include information on classification of the state change. The classification of the state change can include slow, moderate, rapid, and the like. In other embodiments, the actionable response can include an autonomic network reconfiguration. An autonomic network can include a network that can be self-managing. The self-managing network can disconnect itself from the Internet when under attack, can isolate infected or compromised IT infrastructure, etc. In further embodiments, the actionable response can include an autonomic cybersecurity threat protection application reconfiguration. The threat protection application reconfiguration can be based on AI techniques such as machine learning techniques. The application reconfiguration can include adapting the application to evolving cybersecurity threats.

Various embodiments of the flow 100 can be included in a computer program product embodied in a non-transitory computer readable medium that includes code executable by one or more processors.

Figure 2:
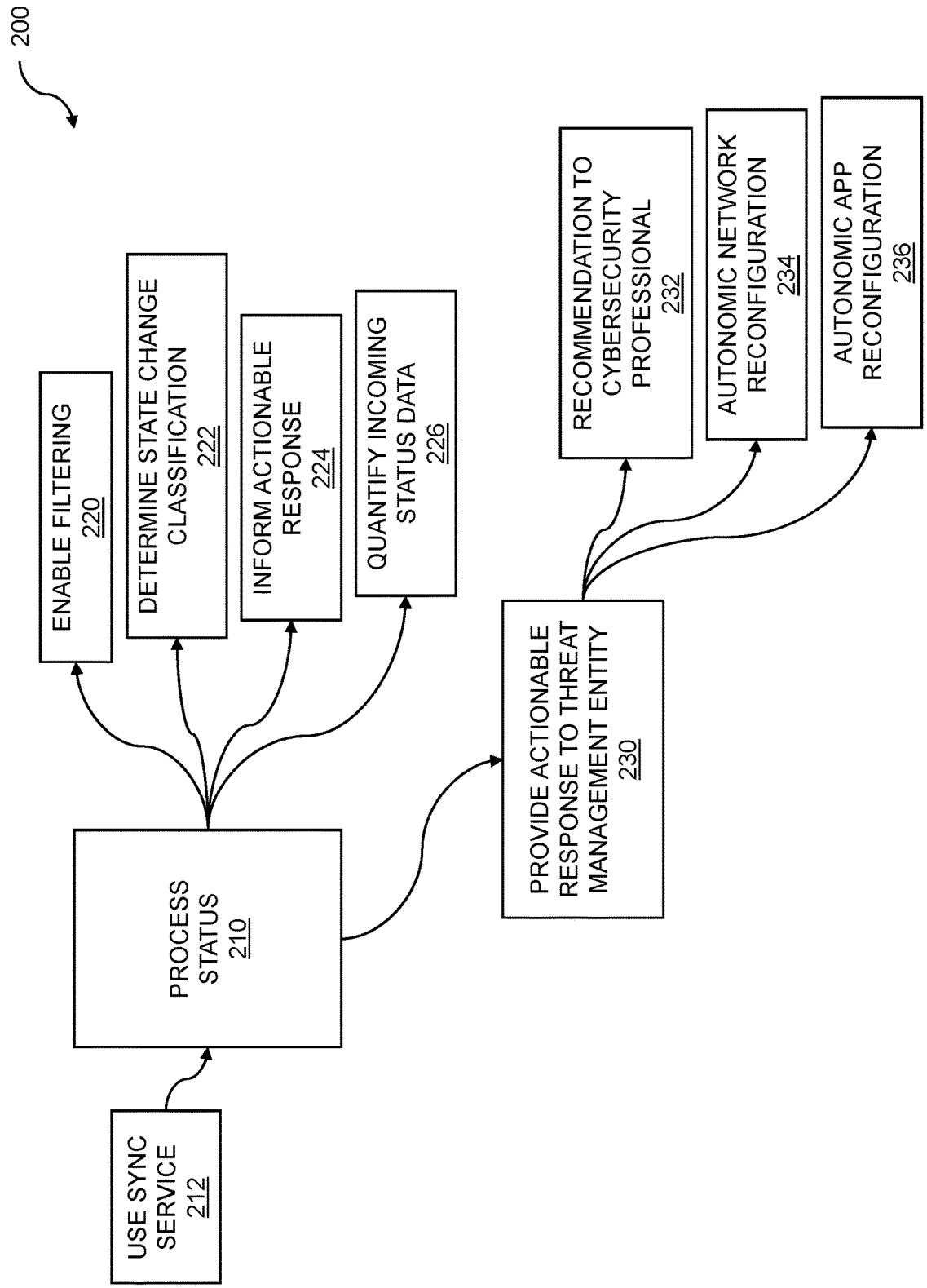
FIG. 2 is a flow diagram for status processing.

FIG. 2 is a flow diagram for status processing. A status can include a status from one or more cybersecurity threat protection applications, where the cybersecurity threat protection applications can be accessed for cybersecurity management. A wide range of cybersecurity threats are launched as often as every few seconds. Each threat requires an effective response to counteract the threat. Discussed above and throughout, network-connected cybersecurity threat protection applications can be used to detect anomalous IT infrastructure operation and threats. The applications can provide a status, where the status can indicate normal operation, anomalous operation, suspicious operation, etc. More than one threat protection application can be used to provide status associated with a threat, to detect different aspects of a threat, and so on. The status can be processed using a cybersecurity state change buffer service in support of cybersecurity management. A plurality of network-connected cybersecurity threat protection applications is accessed. A background synchronization service is initiated, wherein the background synchronization service receives status from at least one of the plurality of cybersecurity threat protection applications. The status is monitored using the background synchronization service. A real-time state change in the status is identified based on the monitoring. An actionable response is triggered based on the state change that was identified.

The flow 200 includes processing a status 210. Status can be received from at least one of the plurality of cybersecurity threat protection applications. A status can include an alert, and alarm, and so on. A status can be based on various data types such as integer, real, and floating-point data types, character data types, etc. In the flow 200, the processing is accomplished using the background synchronization service 212 to provide the actionable response (discussed below). In the flow 200, the processing the status can enable filtering 220 incoming status data. The filtering the incoming status data can include finding and deleting or diverting redundant data, removing suspicious data, and the like. The filtering can be used to reduce demands on cybersecurity management computational resources. In the flow 200, the processing the status can include determining a classification 222 of the state change. A classification can include a type of cybersecurity threat, a severity of the threat, a threat priority, etc. In the flow 200, the processing the status can inform 224 the actionable response. An actionable response (discussed shortly below) can enable system self-healing, such as self-healing of a SOAR system. In embodiments, the self-healing can be used to prevent SOAR downtime. In the flow 200, the processing the status can include quantifying 226 incoming data associated with the status. The quantifying the incoming status data can be used to determine whether the amount of data that is being received for processing is a normal or expected amount, an abnormal or suspicious amount, and the like.

The flow 200 includes providing an actionable response 230 to a threat management entity. The actionable response can include invoking a threat response policy, executing a threat response process, and so on. In the flow 200, the actionable response comprises a recommendation 232 to a cybersecurity professional. The recommendation can include activating a response policy, accessing tools to counteract the threat, and the like. In the flow 200, the actionable response can include an autonomic network reconfiguration 234. An autonomic network can include a network that can be designed for self-management. A self-managed network can enable new IT infrastructure such as switches and routers, disable or isolate misbehaving IT infrastructure, and so on. In the flow 200, the actionable response can include an autonomic cybersecurity threat protection application reconfiguration 236. One or more threat protection applications can be added, removed, reinstalled, reconfigured, rebooted, isolated, etc.

Various embodiments of the flow 200 can be included in a computer program product embodied in a non-transitory computer readable medium that includes code executable by one or more processors.

Figure 3:
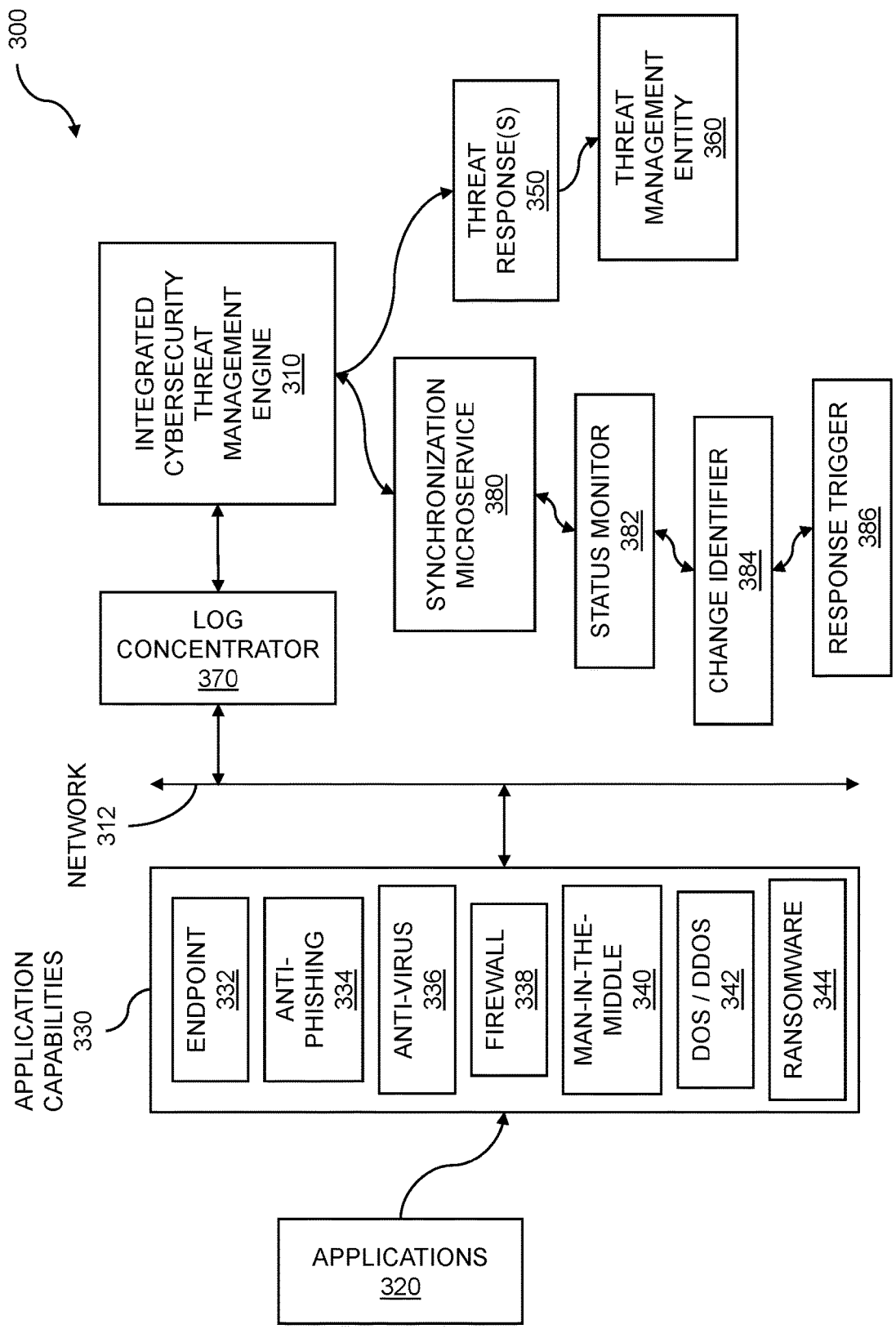
FIG. 3 is a system block diagram for cybersecurity state change buffer service.

FIG. 3 is a system block diagram for cybersecurity state change buffer service. The state change buffer service enables cybersecurity threat management. Threat management such as cybersecurity threat management includes detecting one or more cybersecurity threats and generating one or more responses to those threats. The threats can originate from within an organization, from beyond an organization, or from sources within and beyond the organization. The threats can range from relatively minor ones that can be easily detected and eradicated to major threats that completely disable the operation of the organization. The threats can be detected using one or more applications that can monitor a variety of IT-based activities. By providing a cybersecurity state change buffer service, threat management can be accomplished. A plurality of network-connected cybersecurity threat protection applications is accessed. A background synchronization service is initiated, wherein the background synchronization service receives status from at least one of the plurality of cybersecurity threat protection applications. The status is monitored using the background synchronization service. A real-time state change in the status is identified based on the monitoring. An actionable response is triggered based on the state change that was identified.

An example system block diagram for threat management 300 is shown. Threat management, such as cybersecurity threat management, is critical to an organization. The cybersecurity threat management is used to monitor operations such as data operations within the organization. When anomalies or outright threats are detected, threat management applies a variety of techniques to determine the cause of an anomaly, a source of a threat, and responses to the anomalies and threats. The system block diagram can include an integrated cybersecurity threat management engine 310. The management engine can access applications; collect and ingest log files from the applications; sort, integrate, and evaluate threat protection elements; and so on. The engine can include one or more processors, processor cores within integrated circuits or chips, CPUs, GPUs, and so on. The management engine can be coupled to a network 312 such as a computer network. The network can be based on wired and wireless communications techniques.

The system block diagram can include a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, can perform similar or redundant tasks, and the like. The applications within the plurality of cybersecurity threat protection applications can include application capabilities 330. The application capabilities can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities can include anti-phishing 334 techniques. "Phishing" threats can be based on sending fraudulent email messages, where the messages appear to be from a legitimate sender who may be known to the recipient. The messages are used to gather sensitive, identifying information about an individual which is then used to defraud the individual. The application capabilities can include anti-virus 336 techniques. Anti-virus techniques can be used to detect viruses that can be embedded in data such as images, audio files, and so on. The application capabilities can include firewall 338 techniques. Firewall techniques can be used to block network traffic, applications, etc. that can attempt to penetrate a network and IT infrastructure using one or more network ports and communications protocols. The application capabilities can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities can include denial of service (DOS) and distributed denial of service (DDOS) 342 detection techniques. Denial of service attacks attempt to render a website, computer, processor, and so on unreachable or unusable by overwhelming it with requests. The application capabilities can include ransomware 344 detection techniques. Ransomware attacks encrypt a victim's data. The encrypted data is only decrypted, if at all, after payment of a ransom.

The system block diagram 300 includes one or more threat responses 350. The one or more threat responses are generated by the integrated cybersecurity threat management engine 310. The generated responses can be provided to a cybersecurity threat management entity 360. A cybersecurity threat management entity can include a human-based entity, a machine-based entity, and a combination of human-based and machine-based entities. In embodiments, the cybersecurity threat management entity can be a cybersecurity professional. The cybersecurity professional can be an employee of an organization, a consultant to the organization, and so on. In other embodiments, the cybersecurity threat management entity can be a security orchestration, automation, and response (SOAR) application. The SOAR application can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

The system block diagram 300 incudes a background synchronization microservice 380. The synchronization server can act as a buffer between a plurality of network-connected cybersecurity threat protection applications and the integrated cybersecurity threat management engine. In embodiments, the background synchronization service can include a security orchestration, automation, and response (SOAR) microservice. Discussed previously, the SOAR application microservice can handle threat detection, response generation, case tracking, and so on. In embodiments, the microservice can implement a multidirectional synchronization server. The system block diagram 300 can include a status monitor 382. The status monitor can use the synchronization microservice to monitor status of at least one cybersecurity threat protection application. The monitoring can include monitoring a quantity of data, a type of data, a source of the data, and so on. The system block diagram 300 can include a change identifier 384. The change identifier can identify a real-time state change in the status, based on the monitoring. In embodiments, the change identifier can quantify incoming data associated with the status. A large quantity of incoming data can be associated with a cybersecurity threat, with a hacked or misbehaving network-connected cybersecurity threat protection applications, etc. In embodiments, the state change that was identified can be used to synchronize operation of two or more of the plurality of cybersecurity threat protection applications. The synchronization can be used for redundancy, backup, majority voting, and so on.

The system block diagram includes a response trigger 386. The response trigger can trigger an actionable response, based on the state change that was identified. The actionable response can enable scalability of a connected security orchestration, automation, and response (SOAR) system (discussed below). In embodiments, the actionable response can include a recommendation for a cybersecurity professional. The recommendation can include one or more courses of action, software tools that can be applied to the threat, and so on. In embodiments, the recommendation can include information on classification of the state change. The actionable response that was triggered can include performing one or more autonomic or self-management actions. In embodiments, the actionable response can include an autonomic network reconfiguration. The autonomic network reconfiguration can be used to isolate an enterprise network from the "outside world". The reconfiguration can be used to isolate infected systems, corrected IT infrastructure, etc. The reconfiguration can swap in or swap out networking equipment such as switches and routers. In other embodiments, the actionable response can include an autonomic cybersecurity threat protection application reconfiguration. The autonomic cybersecurity threat protection application reconfiguration can include rebooting or reinstalling the application, scaling the application, isolating hacked or misbehaving applications, and the like.

Figure 4:
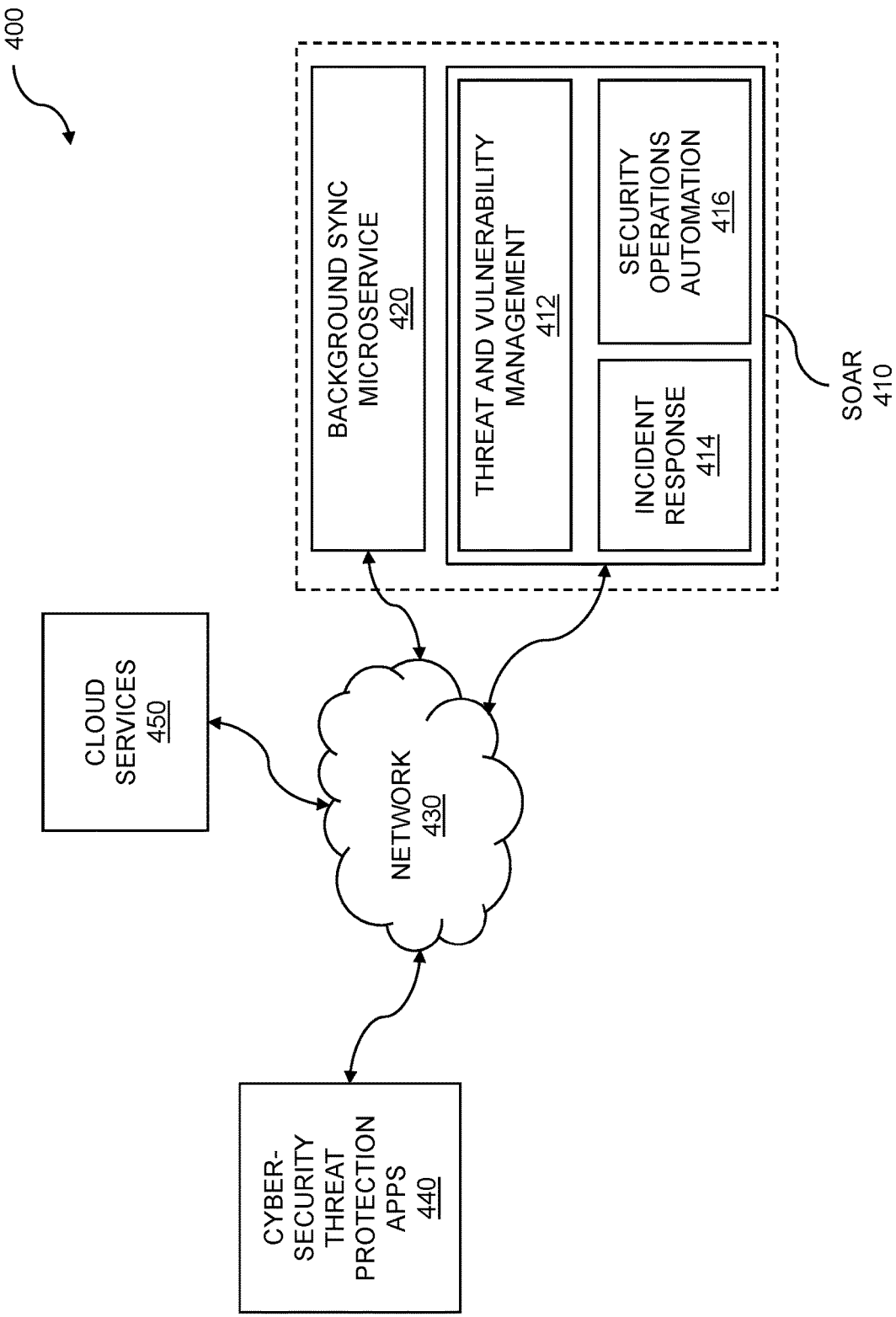
FIG. 4 illustrates a cloud-connected security orchestration, automation, and response (SOAR).

FIG. 4 illustrates a cloud-connected security orchestration, automation, and response (SOAR). Discussed above and throughout, cybersecurity threats arise as often as every few seconds. These threats target individual users, businesses, universities, hospitals, government agencies, and so on. The cybersecurity threats constitute extreme menaces, and indeed existential crises, to the enterprises. Cybersecurity threat management includes identifying that a threat is underway, what IT infrastructure and data is under attack, the type of threat, etc. The cybersecurity threat management ideally then proceeds to block or remove the threat, isolate affected infrastructure, perform eradication or remediation, and the like. Cybersecurity threat management is enabled by a cybersecurity state change buffer service. The state change buffer service seeks to determine that the perceived threat is "real" rather than that a threat protection application is malfunctioning due to an error, a correction, or a hacking attack. A plurality of network-connected cybersecurity threat protection applications is accessed. A background synchronization service is initiated, wherein the background synchronization service receives status from at least one of the plurality of cybersecurity threat protection applications. The status is monitored using the background synchronization service. A real-time state change in the status is identified based on the monitoring. An actionable response is triggered based on the state change that was identified.

Cloud-connected security orchestration, automation, and response (SOAR) is illustrated 400. The SOAR can comprise a cybersecurity component such as 410, where the SOAR can be based on one or more cybersecurity threat protection applications, tools, techniques, and so on. The SOAR can enable data collection from a wide range of data sources such as threat data sources. The threat data sources can include data uploaded by cybersecurity experts, data produced by cybersecurity threat protection applications, and so on. The SOAR can be used to manage threat protection processes, anti-threat technologies, and human expertise. The SOAR can centralize management of IT assets such as networks, processors, data storage elements, etc. The SOAR can provide threat alerts and can provide contexts for the alerts. The SOAR can further automate responses to threats, adapt the responses using machine learning, and so on.

The SOAR 410 can include one or more components associated with cybersecurity threat management. The SOAR can include a threat and vulnerability management component 412. The threat and vulnerability management component can configure and control IT infrastructure elements such as routers, switches, processors, storage area networks (SANs), and so on. The SOAR can include an incident response component 414. The incident response component can provide alerts, can trigger one or more actionable responses, and the like. In embodiments, the actionable response can enable scalability of a connected SOAR system. The SOAR can be scaled up to address a large number of threats, to reduce threat response time, etc. In embodiments, the actionable response can include a recommendation for a cybersecurity professional. The recommendation can include a recommendation for threat response policy, a source for further information about the threat, etc. In further embodiments, the actionable response can include an autonomic network reconfiguration. An autonomic network reconfiguration can include isolating IT elements, restricting IT elements, and the like. In embodiments, the actionable response can include an autonomic cybersecurity threat protection application reconfiguration. The threat protection application reconfiguration can include isolating, reinstalling, reconfiguring, or rebooting an application. The threat protection application reconfiguration can include synchronizing operation of two or more threat protection applications.

The SOAR can include security operations automation 416. Security operations management can include automatically securing IT infrastructure elements such as switches, routers, processors, storage elements, etc., where the securing can be based on a procedure, a policy, and so on. The security operations automation can include updating IT element software and firmware, installing and configuring security software such as antivirus software, and the like. The SOAR can be associated with a background synchronization microservice 420. In embodiments, the microservice can implement a multidirectional synchronization server. The multidirectional synchronization server can synchronize operation of two or more threat protection applications. The synchronization can include pairing applications, comparing status data from the applications, and so on. In a usage example, two antivirus applications can be synchronized. One antivirus application can provide an alert for a detection cybersecurity threat while the second application can provide no indication of a threat. Because of differing detection results, the applications can be analyzed for proper operation, checked for malware, and so on. The microservice can perform these checks and any required remediations without burdening the SOAR.

The SOAR can use a network 430 to access a plurality of cybersecurity threat protection applications 440. The network can include a wired network, a wireless network, a hybrid wireless/wireless network, and so on. The network can be based on wired networking standards such as Ethernet™ (IEEE 802.3), wireless networking standards such as Wi-Fi™ (IEEE 802.11), and so on. The cybersecurity threat protection applications can provide capabilities such as endpoint protection, anti-phishing, antivirus, firewalls, and so on. The cybersecurity threat protection applications can further detect and protect against man-in-the middle ruses, denial of service (DOS) and distributed denial of service (DDOS) attacks, ransomware, and the like. In embodiments, the background synchronization service can communicate to the plurality of network-connected cybersecurity threat protection applications using cloud services 450. The cloud services can provide access and can provide IT services such as software as a service (SaaS), platform as a service (PaaS), infrastructure as a service (IaaS), and so on.

Figure 5:
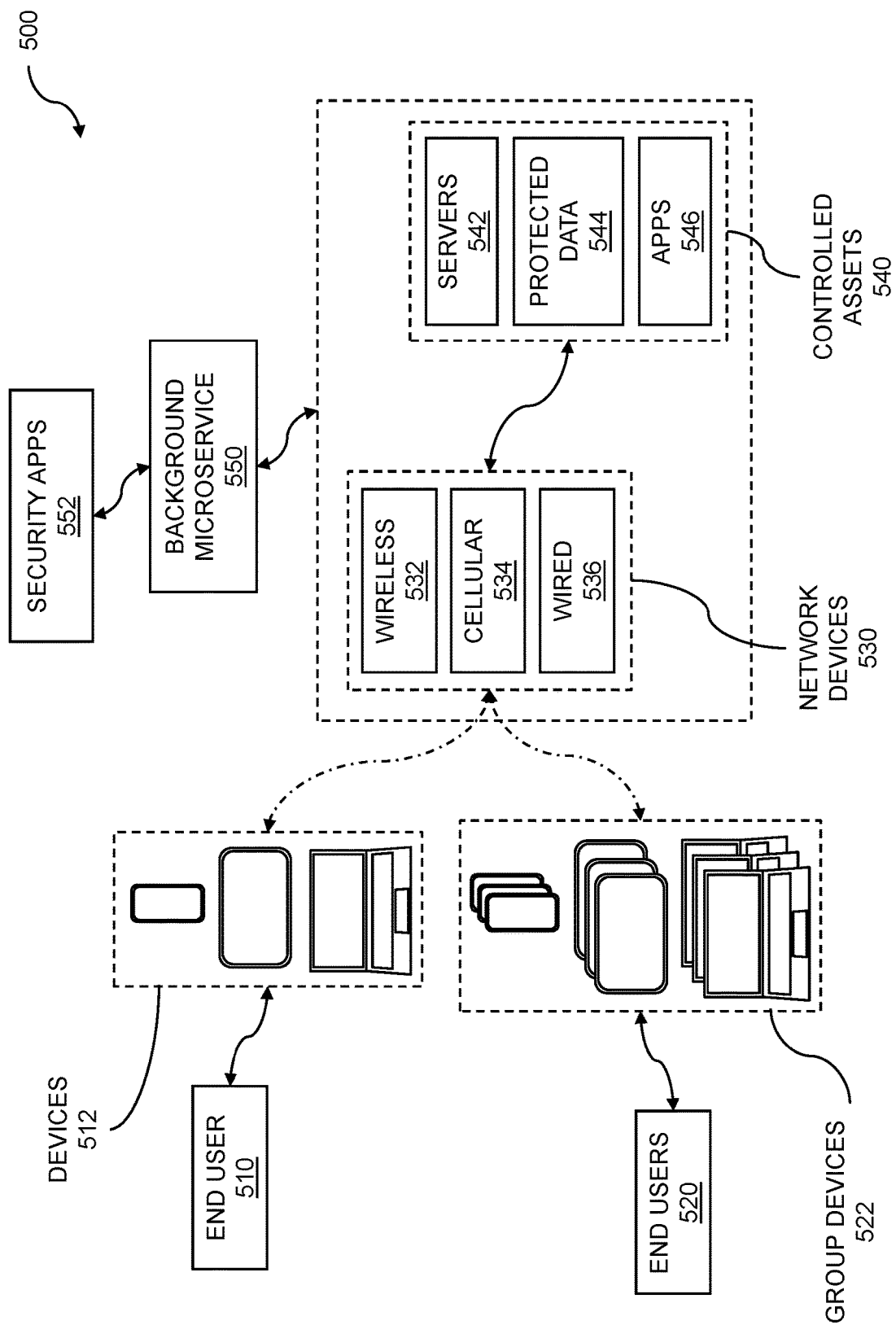
FIG. 5 is a system block diagram for devices and groups.

FIG. 5 is a system block diagram for devices and groups. Cybersecurity threats pose extreme risks to data networks associated with individual users, business enterprises, universities, hospitals, government agencies, and so on. Management of a cybersecurity threat can include identifying that a threat exists, determining the type of threat, blocking or removing the threat, and so on. Threat management techniques can be applied to individual devices, groups of devices, networks, IT assets, and so on. Cybersecurity management of devices and groups uses a state change buffer service. A plurality of network-connected cybersecurity threat protection applications is accessed. A background synchronization service is initiated, wherein the background synchronization service receives status from at least one of the plurality of cybersecurity threat protection applications. The status is monitored using the background synchronization service. A real-time state change in the status is identified based on the monitoring. An actionable response is triggered based on the state change that was identified.

A system block diagram for an individual user, groups of users, and devices 500 is shown. A user 510 can access one or more devices 512. The user can include an employee, a contractor, a faculty member, a student, a physician, a nurse, a manager, a salesperson, and so on. The user can have access to the one or more devices for purposes such as interacting with an enterprise, university, hospital, retail establishment, and the like. The devices can include personal electronic devices, electronic devices issued by an employer, etc. The devices can include a handheld device such as a smartphone, tablet, PDA, and the like. The devices can include a laptop, a lightweight device such as a Chromebook™ or similar device, and so on. A group of users 520 can access a plurality of devices 522. The users can also include employees, university or hospital affiliates, etc. The users can access a plurality of devices for purposes such as interacting with an enterprise, etc. The devices can include personal electronic devices, electronic devices issued by an employer, etc. The devices can include handheld devices, a laptop, a lightweight device, etc.

In the system block diagram 500, communication to and from individual devices, groups of devices, and so on, is accomplished using one or more network devices 530. The network devices can support data transfer, network resource access, and the like. Various types of network devices can be used. In embodiments, the network devices can support wireless 532 networking. The wireless network can be based on standard computer communication protocols such as 802.11 Wi-Fi, Bluetooth, etc. In other embodiments, the network devices can support cellular 534 communication. The cellular communication can be based on standard protocols such as CDMA and GSM standards. The cellular communication can include 4G, 5G, and so on. In other embodiments, the network devices can support wired 536 communication. The wired network communication can be based on standards such as Ethernet™.

The individual users and groups of users can use their devices to communicate with controlled assets 540. Access to controlled assets can require authentication such as a username and password, two-factor authentication, a cryptographic key, and so on. In the system block diagram 500, the controlled assets can include servers 542. The servers can include processors, CPUs, GPUs, processor cores, and so on. The servers can include parallel processors. The servers can include customized servers for specialized applications. The controlled assets can include protected data 544. The protected data can include secured data, confidential data, classified data, and the like. Access to the protected data can be based on authentication, on a job type, on an employee rank, etc. The controlled assets can include applications 546. The applications can include specialized applications for data analysis; proprietary code for design, analysis, and processing; etc. Access to the applications can also include authentication, access controlled by an access control list (ACL), and the like.

The system block diagram 500 can include a background microservice 550. Discussed above and throughout, the background microservice can provide background synchronization between a plurality of cybersecurity threat protection applications 552 and a cybersecurity manager. The background microservice can receive a status from at least one of the plurality of cybersecurity threat protection applications. The status, which can include high-volume incoming status data, can be monitored. The monitoring can be a basis for identifying a real-time state change in the status. The status that is monitored by the background microservice can also be processed. The processing the status can enable the filtering of incoming status data. The filtering can include identifying and removing duplicate data, removing spurious or erroneous data, etc. The processing can further inform an actionable response to a real-time state change in the status. The informing can include a recommendation for a cybersecurity professional. The recommendation for the cybersecurity professional can include recommending a course of action to further characterize a cybersecurity threat, recommending tools for stopping and eradicating the threat, and the like. In embodiments, the recommendation can include information on classification of the state change.

Figure 6:
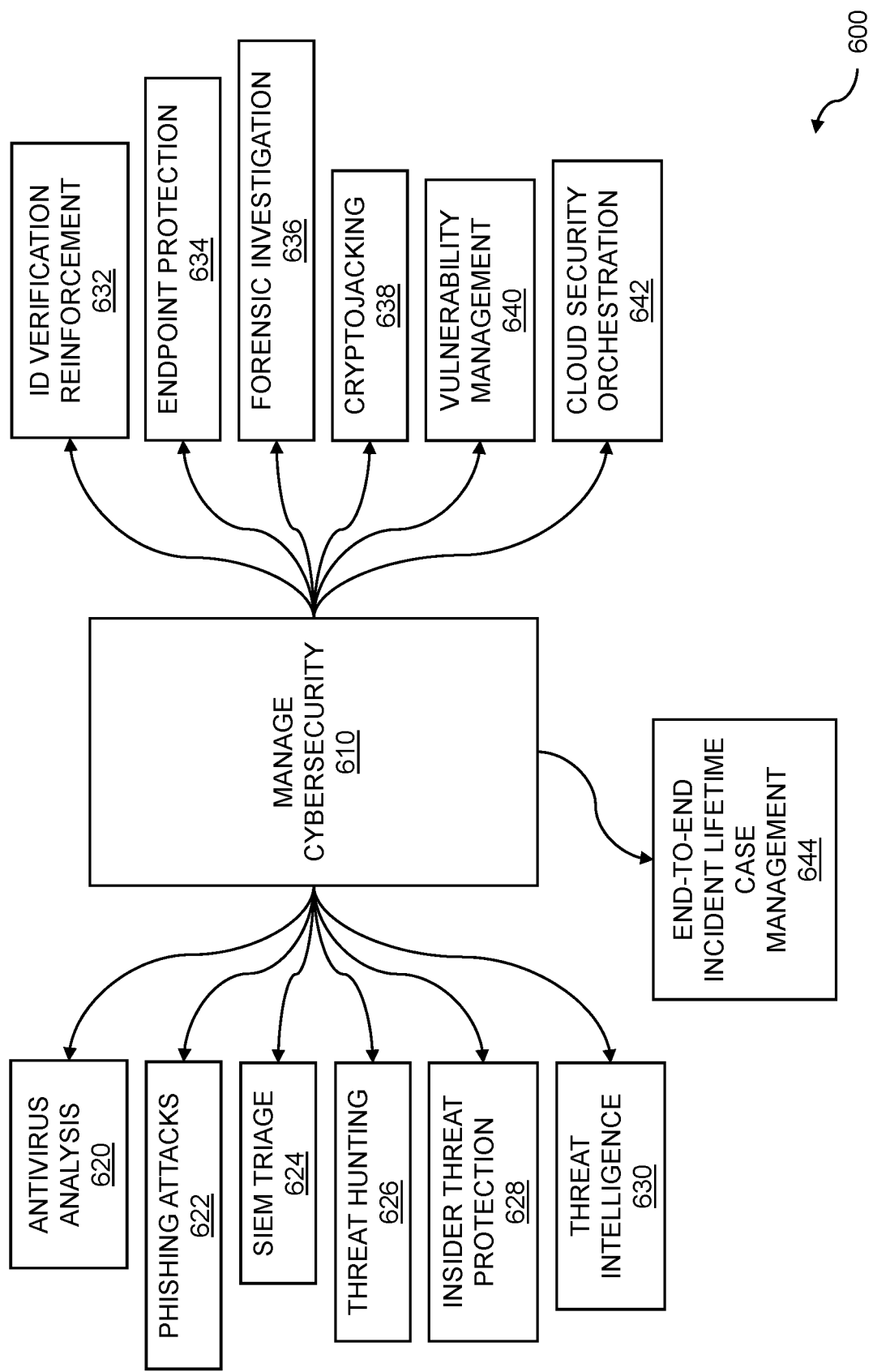
FIG. 6 is a flow diagram for cybersecurity management.

FIG. 6 is a flow diagram for cybersecurity management. Information technology (IT) infrastructure comprises computing devices, storage devices, networks, perhaps personal devices, and so on. Whether these IT elements are operated by an individual for personal use or by an organization in support of operations, all of the IT elements are targets of attacks from outside an organization. Worse yet, the attacks can even originate from within an organization. Cybersecurity threat management includes accessing a variety of threat protection applications. The applications can detect an attack, determine the type of attack, determine the origin of an attack, and so on. Further, cybersecurity management provides techniques for addressing issues resulting from the attacks by countering the attacks and rectifying issues caused by the attacks. The various threat protection applications provide elements for detecting, neutralizing, countering, and rectifying cybersecurity threats. The elements associated with the applications can address substantially similar cybersecurity needs. Cybersecurity management is accomplished using a cybersecurity state change buffer service. A plurality of network-connected cybersecurity threat protection applications is accessed. A background synchronization service is initiated, wherein the background synchronization service receives status from at least one of the plurality of cybersecurity threat protection applications. The status is monitored using the background synchronization service. A real-time state change in the status is identified based on the monitoring. An actionable response is triggered based on the state change that was identified.

The diagram 600 includes cybersecurity management 610. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The diagram 600 includes antivirus analysis 620. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The diagram 600 can include analysis of phishing attacks 622. Phishing is a form of attack that attempts to fraudulently obtain personal, sensitive, or private data and information. The data or information that is sought by a phishing attack can include personal information such as name, address, date of birth, telephone numbers, email addresses, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The diagram 600 includes security information and event management (STEM) triage 624. SIEM, which combines the management of security information and security events, can provide analysis of security alerts, alarms, warnings, etc., in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The diagram 600 includes threat hunting 626. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The diagram 600 includes insider threat protection 628. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The diagram 600 includes threat intelligence 630. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The diagram 600 includes identity verification reinforcement 632. Identity verification can include techniques to verify that a person who has access to computing systems, data systems, networks, and so on, that are associated with an enterprise, is in fact a real person. Identity verification can be based on physical documents such as a government issued identification documents. The diagram 600 can include endpoint protection 634. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device, including personal electronic devices, meet certain standards prior to connection to the enterprise network. The standards can include approved devices, operating systems, applications, antivirus applications, virtual private network apps, etc.

The diagram 600 includes forensic investigation 636. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The diagram 600 includes the detection of cryptojacking 638. Cryptojacking can include hijacking of computers, servers, personal electronic devices, and so on for the purposes of mining cryptocurrency. The diagram 600 includes vulnerability management 640. Vulnerability management seeks to reduce risks to computing systems, data systems, networks, and so on by identifying, evaluating, correcting, and communicating vulnerabilities associated with the computing systems and the applications that are executed on the computing systems. The diagram 600 includes cloud security orchestration 642. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement. The diagram 600 includes end-to-end incident lifetime case management 644. An incident can include a virus outbreak, a distributed denial of service (DDOS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident.

Figure 7:
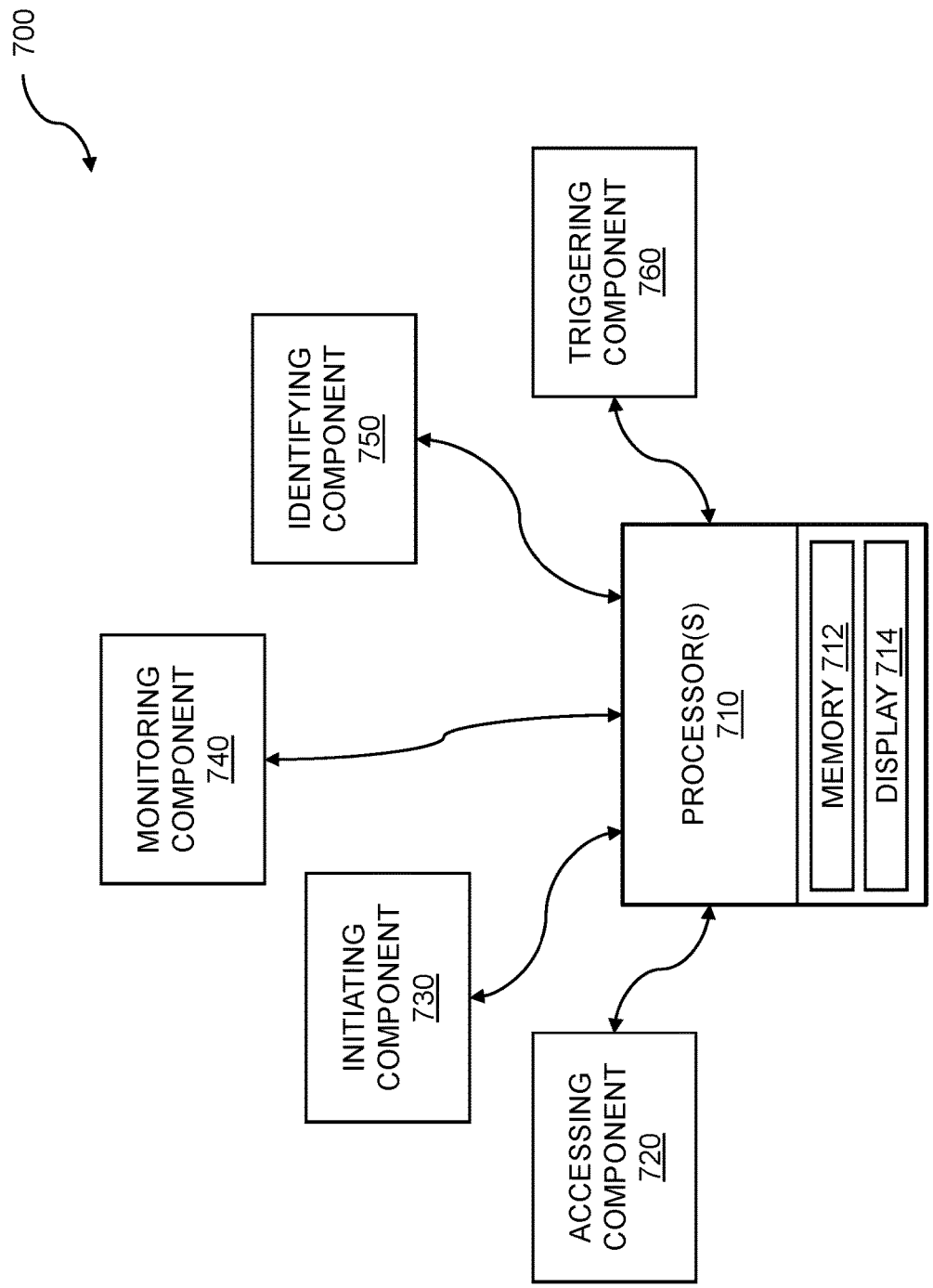
FIG. 7 is a system diagram for cybersecurity state change buffer service.

FIG. 7 is a system diagram for cybersecurity state change buffer service. Organizations of all sizes seek to secure their computing operations and infrastructure against cybersecurity threats. The detection of and response to all cybersecurity threats are mission critical to each of these organizations. The computational operations performed by the organizations are based on data operations including transfers, manipulations, storage, security, and so on. The computing infrastructure used to perform the computational operations includes servers, desktop computers, portable devices, personal devices, etc. Cybersecurity threats have been designed to exploit hardware and software vulnerabilities. The threats are further based on social engineering techniques such as phishing attacks, ransomware, distributed denial of service (DDoS) attacks, third-party software hacks, cloud computing and storage vulnerabilities, and the like. A cybersecurity state change buffer service can be used trigger an actionable response based on an identified real-time state change in status from at least one cybersecurity threat protection application. The real-time state change in status can be used to detect a cybersecurity threat; to determine the extent and severity of the cybersecurity threat; and to remove, neutralize, or counter the threat in as little time and with as minimal disruption as possible. An actionable response can be provided to a cybersecurity threat management entity such as a cybersecurity professional; a security orchestration, automation, and response (SOAR) application; and so on. A plurality of network-connected cybersecurity threat protection applications is accessed. A background synchronization service is initiated, wherein the background synchronization service receives a status from at least one of the plurality of cybersecurity threat protection applications. The status is monitored using the background synchronization service. A real-time state change in the status is identified based on the monitoring. An actionable response is triggered based on the state change that was identified.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more cybersecurity applications, log files, information associated with one or more data networks, a background synchronization service, data associated with a status, one or more actionable responses, and the like. Information associated with cybersecurity threat management can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can include an accessing component 720. The accessing component 720 can be used for accessing a plurality of network-connected cybersecurity threat protection applications. The applications can include applications for threat detection, assessment, and response management; web security; antivirus; dark web monitoring; security ("white hat") testing; and other cybersecurity threat protection application capabilities. In embodiments, the cybersecurity threat protection application capabilities can include endpoint protection, anti-phishing protection, antivirus protection, firewall protection, man-in-the-middle protection, denial of service protection, distributed denial of service protection, and ransomware protection. The plurality of cybersecurity threat protection applications can include at least two different data management schemas. A data management schema can include an organization or collection of management techniques associated with data. The management techniques can include data storage, access control to data (e.g., access control list or ACL, role-based access), and so on. The system 700 includes an initiating component 730. The initiating component 730 is configured to initiate a background synchronization service, wherein the background synchronization service receives status from at least one of the plurality of cybersecurity threat protection applications. The background synchronization service can act as a buffer between the plurality of network-connected cybersecurity threat protection applications and a cybersecurity manager. The background synchronization service can detect a high level of data traffic from a cybersecurity threat protection application, and can process the data to determine when the data indicates a real threat, a hacked cybersecurity threat protection application, etc.

The system 700 can include a monitoring component 740. The monitoring component 740 can monitor the status, using the background synchronization service. Discussed above and throughout, the monitoring can include monitoring the status received from at least one of the plurality of cybersecurity threat protection applications. In embodiments, the status can include high-volume incoming status data. The status data from the one or more cybersecurity threat protection applications can include an indication of a potential, detected, or ongoing cybersecurity event or situation. The status data can include various (e.g., heterogeneous) formats, representations, and so on. The status data can include an alert, a warning, etc. The status data can include device-related information. The device-related information can include a type of device such as a handheld device, a portable device, a personal device, a device provided by an organization, etc. The status data can include an event name, an application name, an event count, a category such as a low-level category, a source IP address and port, a destination IP address and port, a username, a magnitude, etc. The status data can include threat protection elements. The threat protection elements can include non-cybersecurity, network-related elements. These elements can provide additional information that can help pinpoint a source of a cybersecurity threat, a threat target, a priority level, etc. The non-cybersecurity, network-related elements can include information technology (IT) tool output, network configuration data, cybersecurity threat protection application metadata, network-related metadata, network client physical location data, network client internet protocol (IP) identification data, and user-entered data. The status data can further include information about the user of a device, a data service, and so on. The user information can include identifying information associated with the user; a user's role, status, and rank within an organization; user privileges such as access and security privileges; user location; and the like.

The system 700 can include an identifying component 750. The identifying component 750 can identify a real-time state change in the status, based on the monitoring. The identifying can include identifying a gradual change associated with the status data, a sudden change, and so on. In embodiments, the identifying a real-time state change can include quantifying incoming data associated with the status. The quantifying of incoming data can be associated with detection of a cybersecurity threat. The detection can be based on amount of data, a data "fingerprint", and the like. A status data fingerprint can include a data pattern, changes in amounts of data received, etc. In embodiments, operation of two or more of the plurality of cybersecurity threat protection applications can be synchronized. The synchronizing can be used to verify or confirm status data from a cybersecurity threat protection application, to back up a protection application, and the like. In embodiments, the synchronizing is based on the state change that was identified. The state change can be associated with detection of a cybersecurity threat. The state change can be associated with infection, correction, hacking, etc. of one or more cybersecurity threat protection applications.

The system 700 can include a triggering component 760. The triggering component 760 can trigger an actionable response, based on the state change that was identified. Further embodiments include processing the status, using the background synchronization service, to provide the actionable response. The processing can enable a variety of cybersecurity management techniques. In embodiments, the processing the status can enable filtering incoming status data. The filtering can be used to reduce the amount of status data provided to a cybersecurity manager component (not shown). The filter can include filtering out bogus status data that can result from rogue, hacked, or otherwise malfunctioning threat protection applications. In embodiments, the processing the status can inform the actionable response. Informing the actionable response can include recommending a response, providing a recommendation to a cybersecurity professional, and so on. In other embodiments, the actionable response can enable self-healing of a connected security orchestration, automation, and response (SOAR) system. The self-healing the connected SOAR can include reloading the SOAR, rebooting the SOAR, switching out a SOAR, swapping in a SOAR, etc. In other embodiments, the actionable response can enable scalability of a connected security orchestration, automation, and response (SOAR) system. The scalability of the connected SOAR can include enabling redundancy, expanding the capabilities of the SOAR, reducing the capabilities of the SOAR, and the like. Other actions can be recommended or undertaken based on a triggered actionable response. In embodiments, the actionable response can include an autonomic network reconfiguration. The actionable response can include enabling or disabling components such as computers, processors, storage elements, and so on. In other embodiments, the actionable response can include an autonomic cybersecurity threat protection application reconfiguration.

The generating an actionable response for cybersecurity threat management can include generating a notification. The notification can be used to trigger a variety of responses. The responding to a cybersecurity threat notification can include managing individual devices coupled to a data network, groups of devices, regions of a data network, and so on. The responding can include granting user access to an asset, denying access, isolating one or more devices, notifying security or law enforcement, and the like. The responding can include one or more tasks, procedures, protocols, workflows, techniques, etc., associated with cybersecurity. In embodiments, the responding to a cybersecurity threat can include managing one or more of antivirus analysis, phishing attack response, review, security information and event management (STEM) triage, threat hunting, insider threat protection, threat intelligence, identity verification reinforcement, endpoint protection, forensic investigation, cryptojacking, vulnerability, cloud security orchestration, and end-to-end incident lifecycle cases. The responding can include "white hat" testing such as penetration testing of one or more of networks, systems, devices, and so on. The white hat penetration testing can include white box testing, where a tester can have full access and knowledge of networks, systems, and so on. The white hat testing can further include black box testing (no access or knowledge), gray box testing (some access and knowledge), etc.

The responding can include simulating or emulating cybersecurity threats. Embodiments further include simulating cybersecurity threat scenarios by activating inputs of the first mapping independently of the plurality of cybersecurity threat protection applications. The simulation can be based on virtual activation, actual activation, and so on. In embodiments, the simulating virtually activates cybersecurity measures in a simulation mode. One or more devices coupled to a data network can be taken offline, placed in a "security playpen", etc. In other embodiments, the simulating actually activates cybersecurity measures in the data network. The actually activating cybersecurity measures in the data network can be accomplished using a variety of techniques such as activating outputs of the second mapping. Further embodiments include activating one or more data enrichment protocols for a threat, based on the data stimuli received from at least one of the plurality of cybersecurity threat protection applications. The data enrichment can be accomplished by enabling additional features of a cybersecurity threat application, activating additional applications, etc. In embodiments, the one or more data enrichment protocols can include accessing a website. The website can include a secure website. In embodiments, the accessing a website can enable additional information gathering for the threat.

Further embodiments can include generating a set of rules to enable the sorting, the integrating, the evaluating, and the generating. Various techniques can be applied to generating a set of rules. In embodiments, the set of rules can be determined using human input. The human input can be obtained for a cybersecurity profession, a panel of cybersecurity experts, and the like. In other embodiments, the set of rules can be determined using machine learning. The machine learning can be used to try a wide variety of response scenarios, to evaluate success or failure of a given scenario, to choose a "best" scenario, etc. In other embodiments, the set of rules can be determined using a combination of human input and machine learning.

Disclosed embodiments include a computer program product embodied in a non-transitory computer readable medium for cybersecurity management, the computer program product comprising code which causes one or more processors to perform operations of: accessing a plurality of network-connected cybersecurity threat protection applications; initiating a background synchronization service, wherein the background synchronization service receives status from at least one of the plurality of cybersecurity threat protection applications, and wherein the background synchronization service comprises a multidirectional synchronization server; monitoring the status, using the background synchronization service; identifying a real-time state change in the status, based on the monitoring; and triggering an actionable response, based on the state change that was identified. Disclosed embodiments further include a computer system for cybersecurity comprising: a memory which stores instructions; one or more processors coupled to the memory wherein the one or more processors, when executing the instructions which are stored, are configured to: access a plurality of network-connected cybersecurity threat protection applications; initiate a background synchronization service, wherein the background synchronization service receives status from at least one of the plurality of cybersecurity threat protection applications; monitor the status, using the background synchronization service; identify a real-time state change in the status, based on the monitoring; and trigger an actionable response, based on the state change that was identified.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:
   accessing a plurality of network-connected cybersecurity threat protection applications;
   initiating a background synchronization service, wherein the background synchronization service receives status from at least one of the plurality of cybersecurity threat protection applications, and wherein the background synchronization service comprises a multidirectional synchronization server;
   monitoring the status, using the background synchronization service;
   identifying a real-time state change in the status, based on the monitoring; and
   triggering an actionable response, based on the state change that was identified.

2. The method of claim 1 further comprising processing the status, using the background synchronization service, to provide the actionable response.

3. The method of claim 2 wherein the processing the status enables filtering incoming status data.

4. The method of claim 2 wherein the processing the status includes determining a classification of the state change.

5. The method of claim 2 wherein the processing the status informs the actionable response.

6. The method of claim 2 wherein the identifying a real-time state change includes quantifying incoming data associated with the status.

7. The method of claim 1 wherein the status comprises high-volume incoming status data.

8. The method of claim 7 wherein the actionable response enables self-healing of a connected security orchestration, automation, and response (SOAR) application system.

9. The method of claim 8 wherein the self-healing prevents SOAR downtime.

10. The method of claim 7 wherein the actionable response enables scalability of a connected security orchestration, automation, and response (SOAR) system.

11. The method of claim 1 further comprising synchronizing operation of two or more of the plurality of cybersecurity threat protection applications.

12. The method of claim 11 wherein the synchronizing is based on the state change that was identified.

13. The method of claim 1 wherein the actionable response comprises a recommendation for a cybersecurity professional.

14. The method of claim 13 wherein the recommendation includes information on classification of the state change.

15. The method of claim 1 wherein the actionable response comprises an autonomic network reconfiguration.

16. The method of claim 1 wherein the actionable response comprises an autonomic cybersecurity threat protection application reconfiguration.

17. The method of claim 1 wherein the background synchronization service comprises a security orchestration, automation, and response (SOAR) microservice.

18. The method of claim 17 wherein the microservice implements the multidirectional synchronization server.

19. The method of claim 1 wherein the background synchronization service monitors cybersecurity threat protection application health.

20. The method of claim 1 wherein the background synchronization service communicates to the plurality of network-connected cybersecurity threat protection applications using cloud services.

21. The method of claim 20 wherein the cloud services and the background synchronization service enable redeployment of cybersecurity threat protection assets.

22. A computer program product embodied in a non-transitory computer readable medium for cybersecurity management, the computer program product comprising code which causes one or more processors to perform operations of:

accessing a plurality of network-connected cybersecurity threat protection applications;

initiating a background synchronization service, wherein the background synchronization service receives status from at least one of the plurality of cybersecurity threat protection applications, and wherein the background synchronization service comprises a multidirectional synchronization server;

monitoring the status, using the background synchronization service;

identifying a real-time state change in the status, based on the monitoring; and triggering an actionable response, based on the state change that was identified.

23. A computer system for cybersecurity comprising:

a memory which stores instructions;

one or more processors coupled to the memory, wherein the one or more processors, when executing the instructions which are stored, are configured to:

access a plurality of network-connected cybersecurity threat protection applications;

initiate a background synchronization service, wherein the background synchronization service receives status from at least one of the plurality of cybersecurity threat protection applications, and wherein the background synchronization service comprises a multidirectional synchronization server;

monitor the status, using the background synchronization service;

identify a real-time state change in the status, based on the monitoring; and trigger an actionable response, based on the state change that was identified.

* * * * *